United States Patent
Prout et al.

(10) Patent No.: US 8,522,940 B2
(45) Date of Patent: Sep. 3, 2013

(54) ENGAGEABLE COUPLING ASSEMBLY HAVING REDUCED SPIN LOSSES AND METHOD OF ASSEMBLING SUCH ASSEMBLY WITHIN AN AUTOMOTIVE TRANSMISSION TO REDUCE SUCH LOSSES

(75) Inventors: Jeffrey J. Prout, Freeland, MI (US); Joseph J. Jurek, Saginaw, MI (US)

(73) Assignee: Means Industries, Inc., Saginaw, MI (US)

( * ) Notice: Subject to any disclaimer, the term of this patent is extended or adjusted under 35 U.S.C. 154(b) by 368 days.

(21) Appl. No.: 12/940,160

(22) Filed: Nov. 5, 2010

(65) Prior Publication Data

US 2011/0192697 A1    Aug. 11, 2011

Related U.S. Application Data

(60) Provisional application No. 61/302,617, filed on Feb. 9, 2010.

(51) Int. Cl.
*F16D 41/12* (2006.01)
*F16D 11/14* (2006.01)
*F16D 41/00* (2006.01)

(52) U.S. Cl.
USPC .................. 192/69.1; 192/46; 192/113.32

(58) Field of Classification Search
USPC .................. 192/69.1, 113.32; 188/82.74
See application file for complete search history.

(56) References Cited

U.S. PATENT DOCUMENTS

| | | | |
|---|---|---|---|
| 5,597,057 A | 1/1997 | Ruth et al. | |
| 5,918,715 A | 7/1999 | Ruth et al. | |
| 5,964,331 A | 10/1999 | Reed et al. | |
| 6,186,299 B1 | 2/2001 | Ruth | |
| 6,193,038 B1 | 2/2001 | Scott et al. | |
| 6,283,265 B1 | 9/2001 | Hirayanagi et al. | |
| 6,830,531 B1 | 12/2004 | Koenig et al. | |
| 7,455,157 B2 | 11/2008 | Kimes et al. | |
| 7,766,144 B2 | 8/2010 | Mordukhovich et al. | |
| 2001/0011623 A1* | 8/2001 | Ogata et al. ............... | 192/113.32 |
| 2006/0266614 A1 | 11/2006 | Maguire et al. | |

(Continued)

OTHER PUBLICATIONS

International Search Report; International Application No. PCT/US2010/059223; date of mailing Feb. 8, 2011.

(Continued)

*Primary Examiner* — Rodney Bonck
(74) *Attorney, Agent, or Firm* — Brooks Kushman P.C.

(57) ABSTRACT

An engageable coupling assembly having reduced spin losses and method of assembling such assembly within an automotive transmission to reduce such losses are provided. The assembly is adapted for use with pressurized fluid. The assembly includes first and second coupling members that are supported with respect to each other for relative rotation about a common rotational axis. The coupling members have a first pair of annular faces that oppose each other and define an annular space therebetween. A first face of the first pair has a set of pockets spaced about the rotational axis. A second face of the first pair has a set of locking formations. The coupling members have a second pair of annular faces that oppose each other. A first face of the second pair defines a first set of fluid grooves fluidly communicating the annular space with an exterior surface of the assembly. The fluid grooves are configured to conduct the pressurized fluid from the annular space and out of the assembly in an axial direction during an overrun condition of the assembly, thereby reducing spin losses when the assembly is disengaged.

17 Claims, 10 Drawing Sheets

(56) References Cited

U.S. PATENT DOCUMENTS

| | | | |
|---|---|---|---|
| 2007/0199785 A1* | 8/2007 | Lane et al. | 192/46 |
| 2008/0135370 A1* | 6/2008 | Gooden et al. | 192/113.34 |
| 2009/0045024 A1 | 2/2009 | Ruth | |
| 2009/0118933 A1 | 5/2009 | Heap | |
| 2009/0159391 A1 | 6/2009 | Eisengruber | |
| 2009/0211863 A1 | 8/2009 | Kimes | |

OTHER PUBLICATIONS

International Preliminary Report on Patentability; International application No. PCT 2010/059223; date of issuance of report Aug. 14, 2012.

* cited by examiner

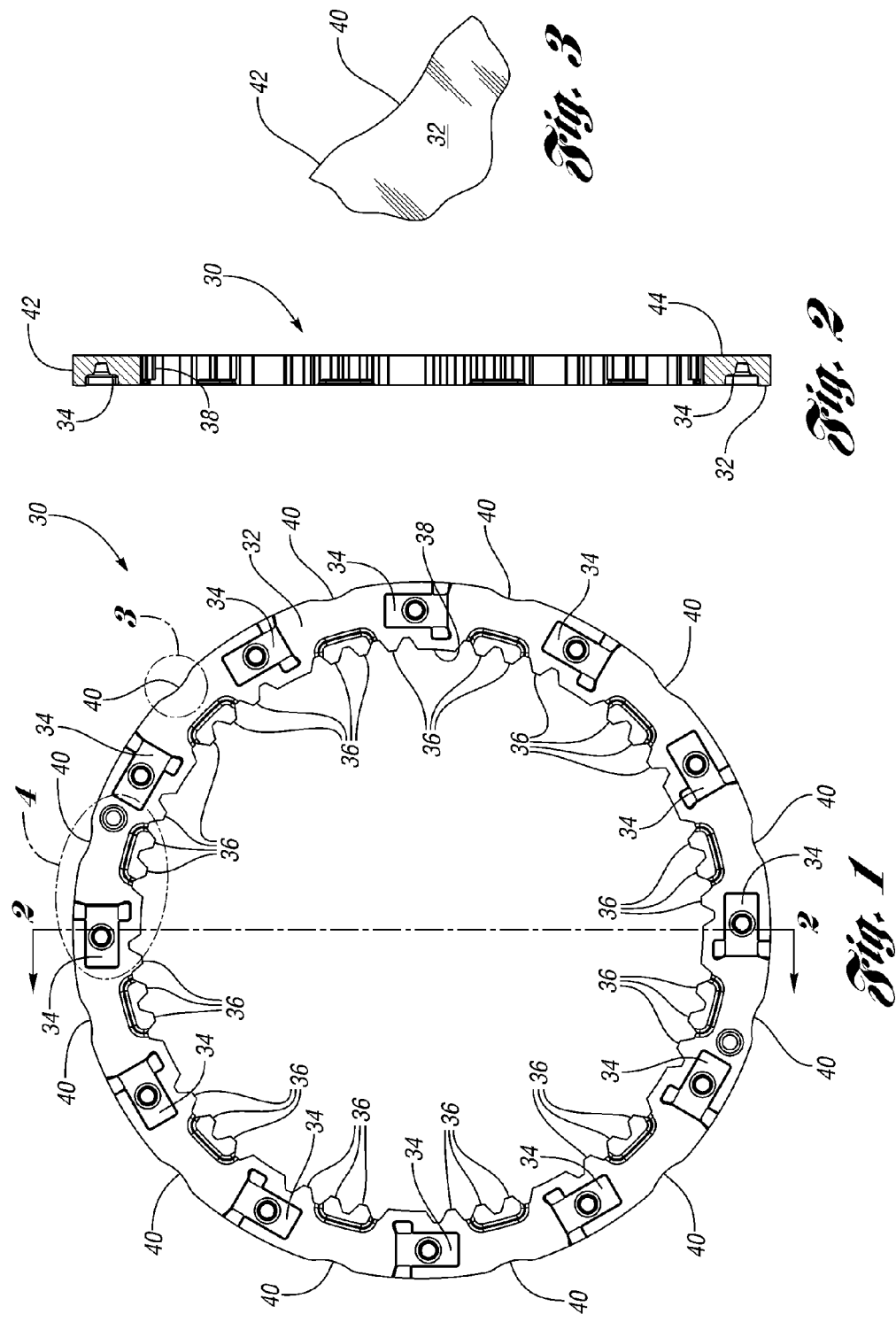

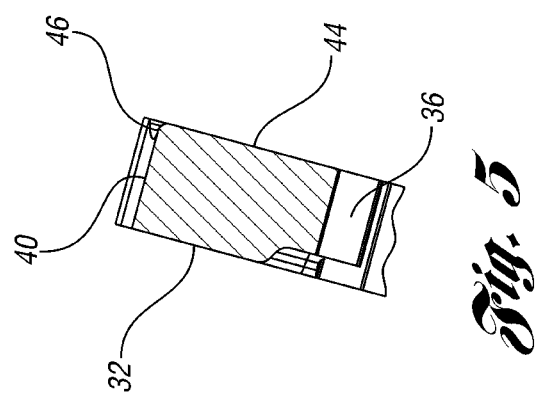
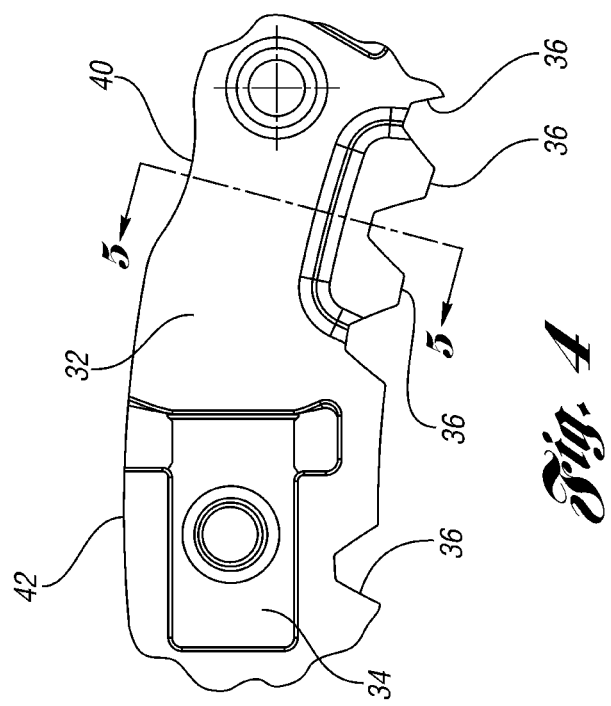

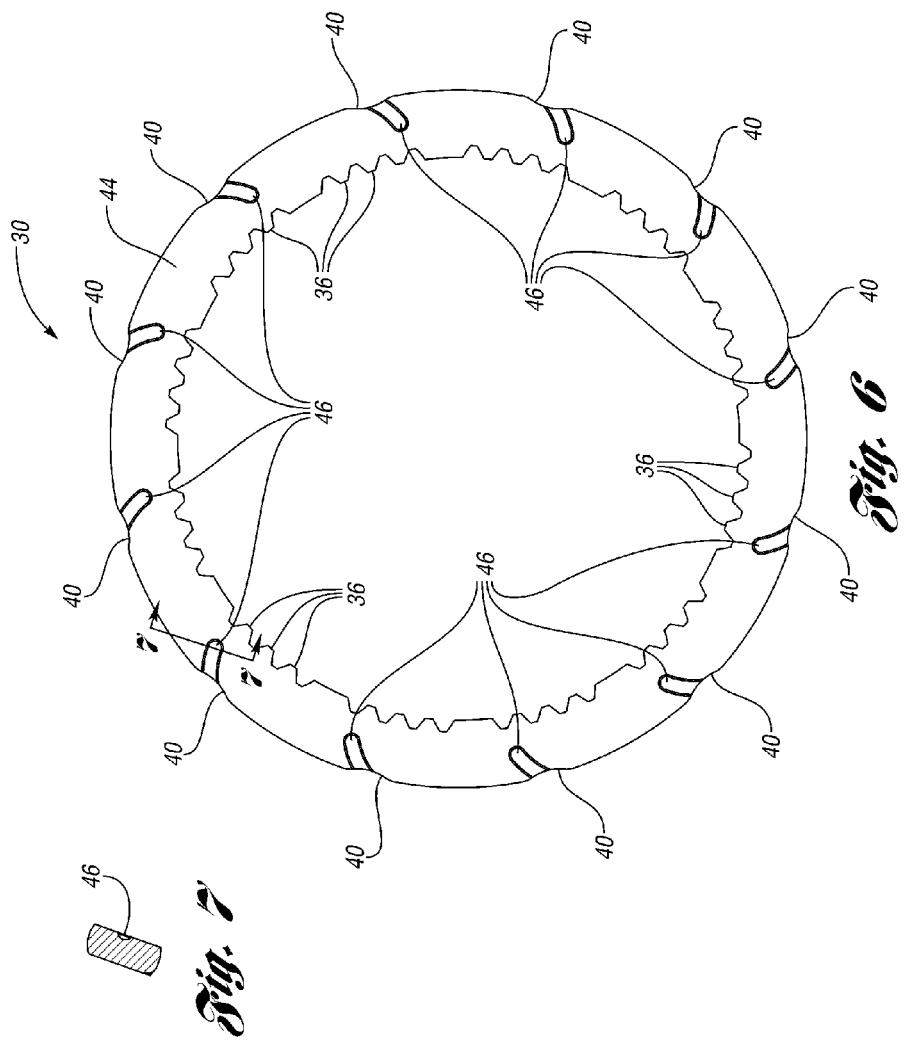

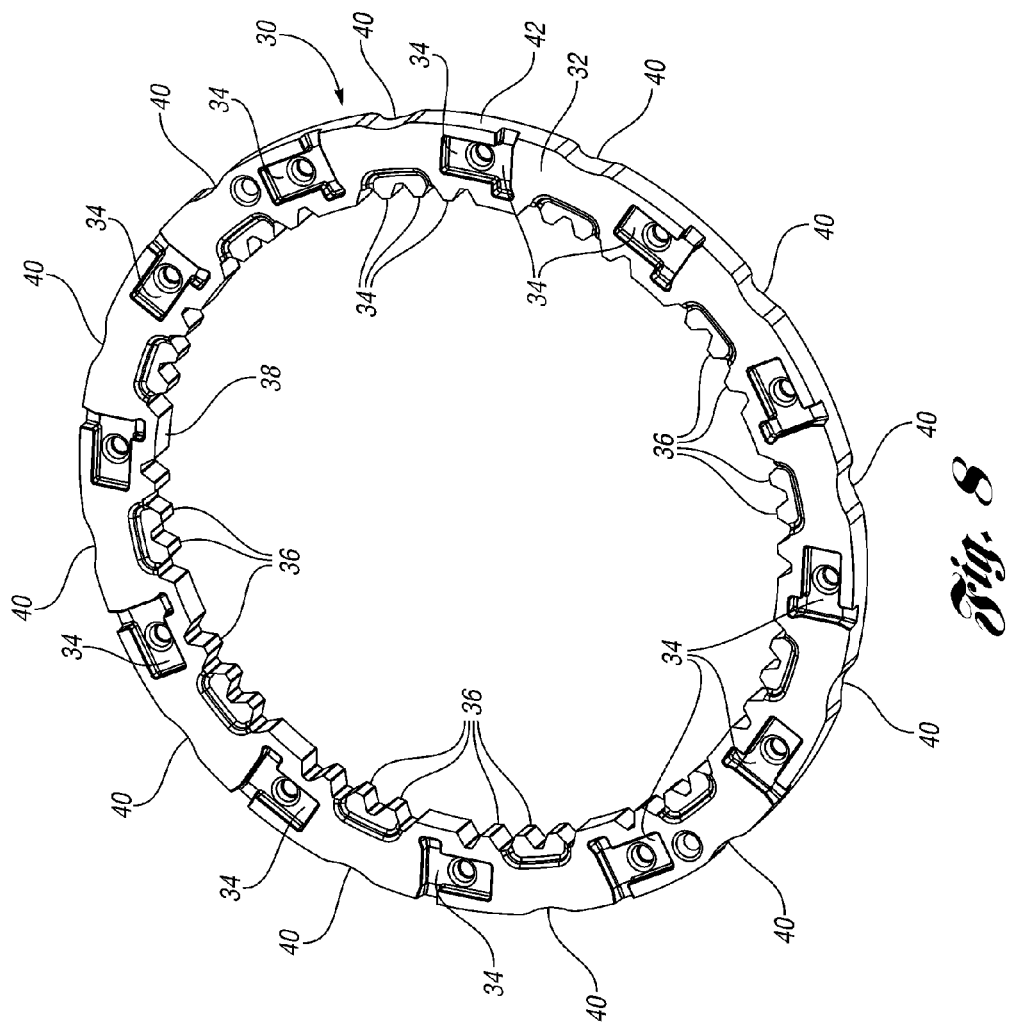

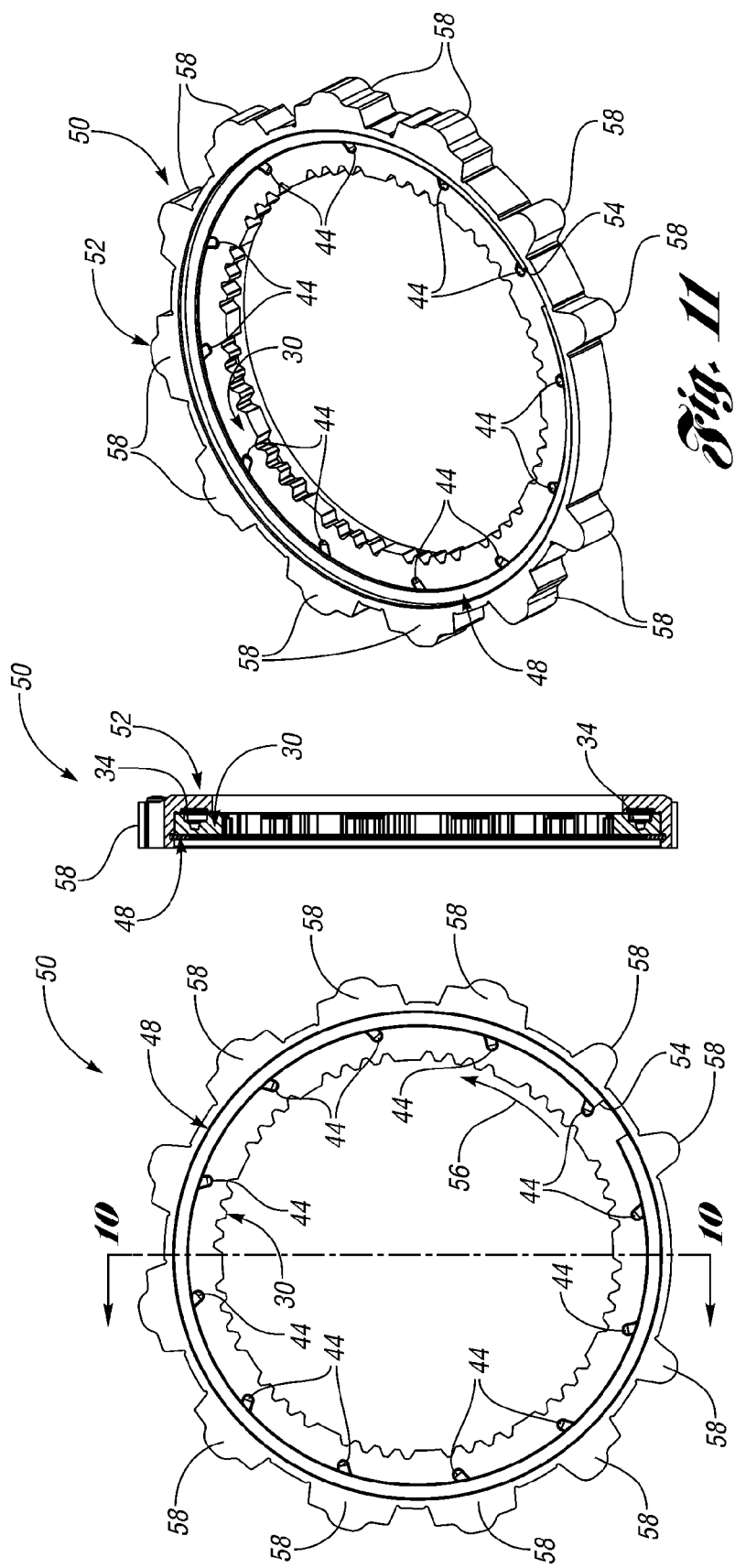

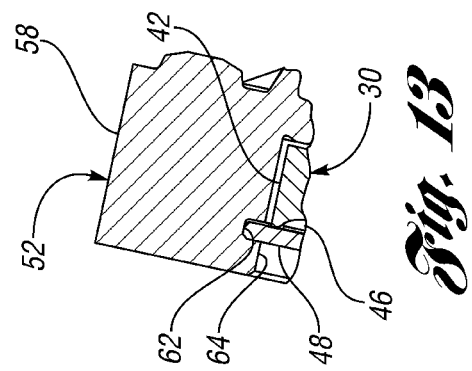
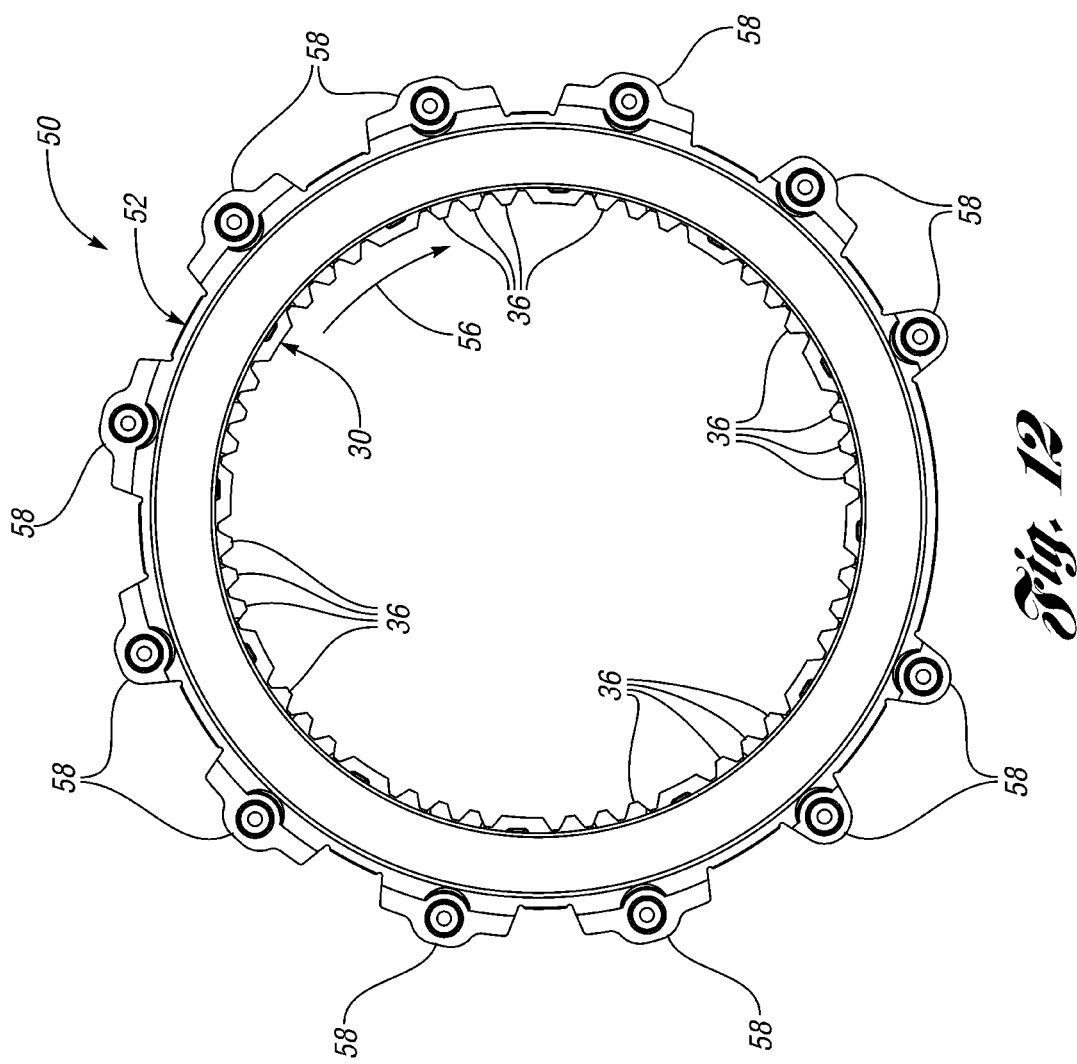

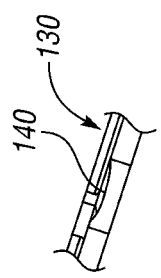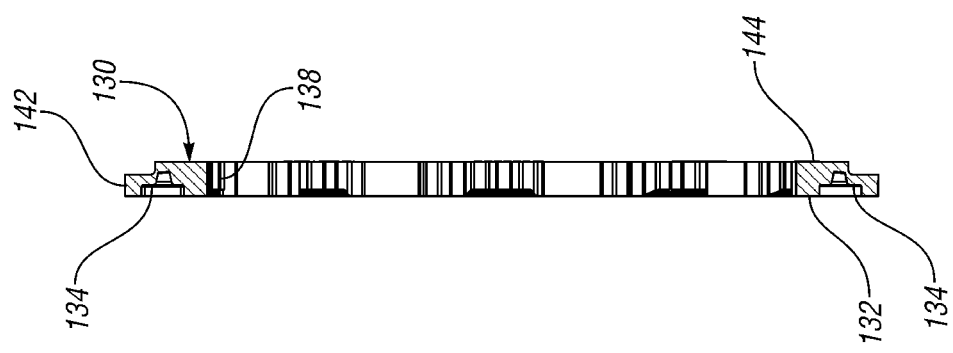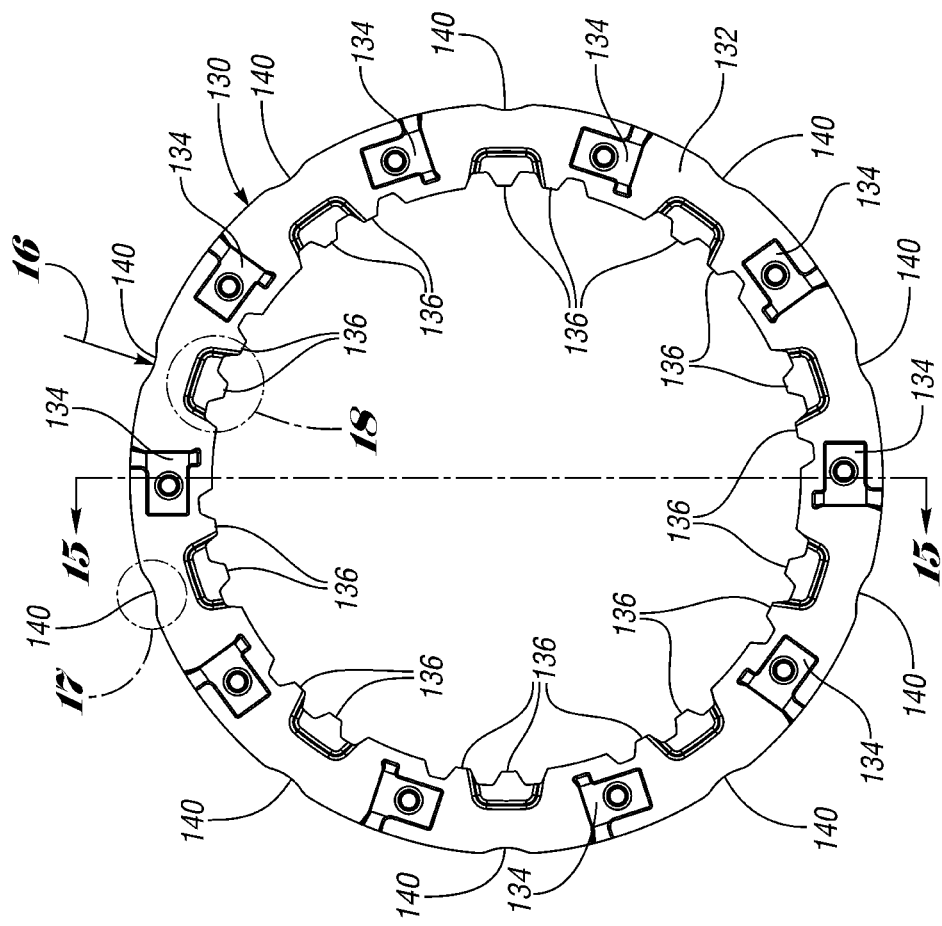

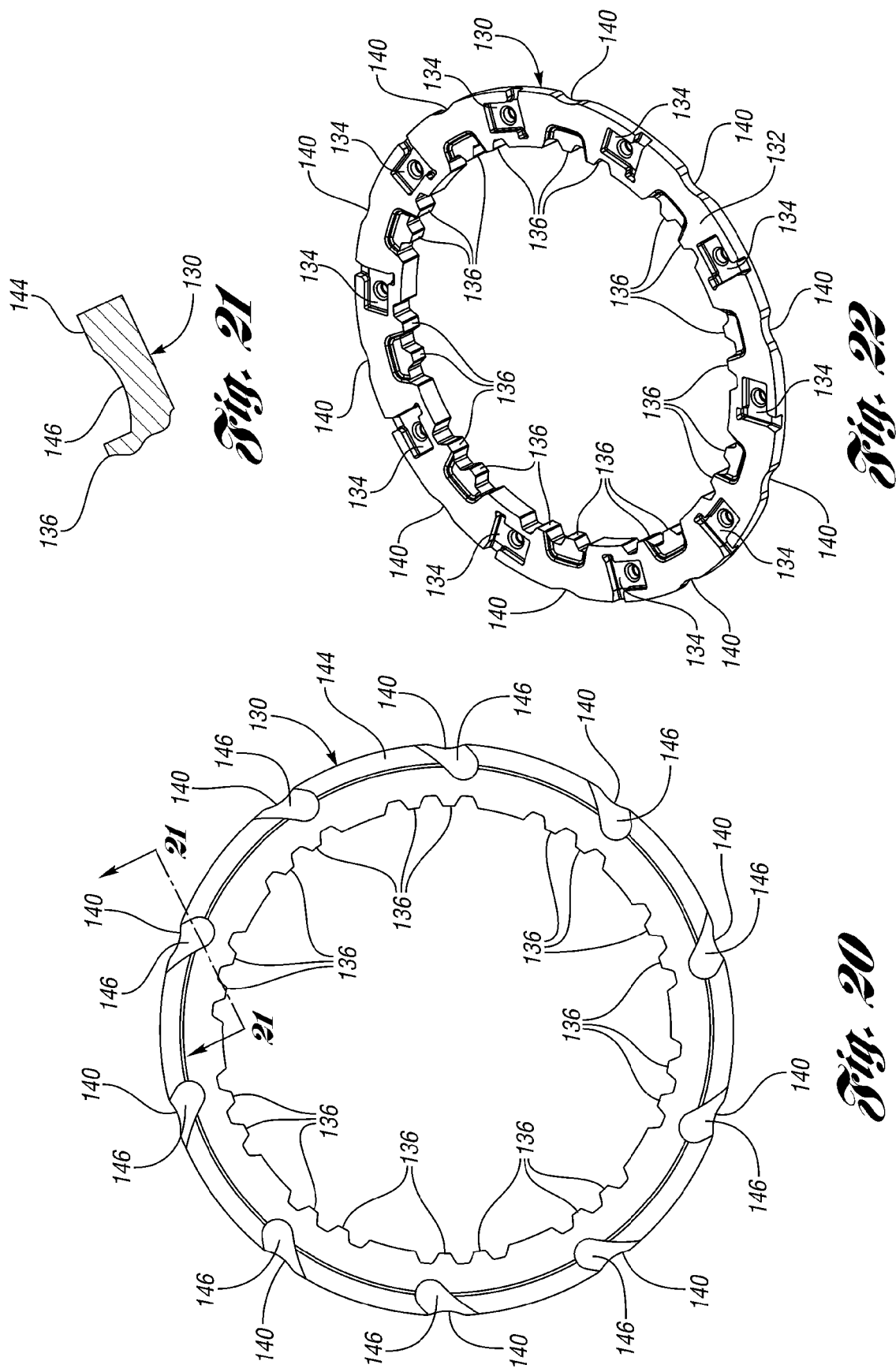

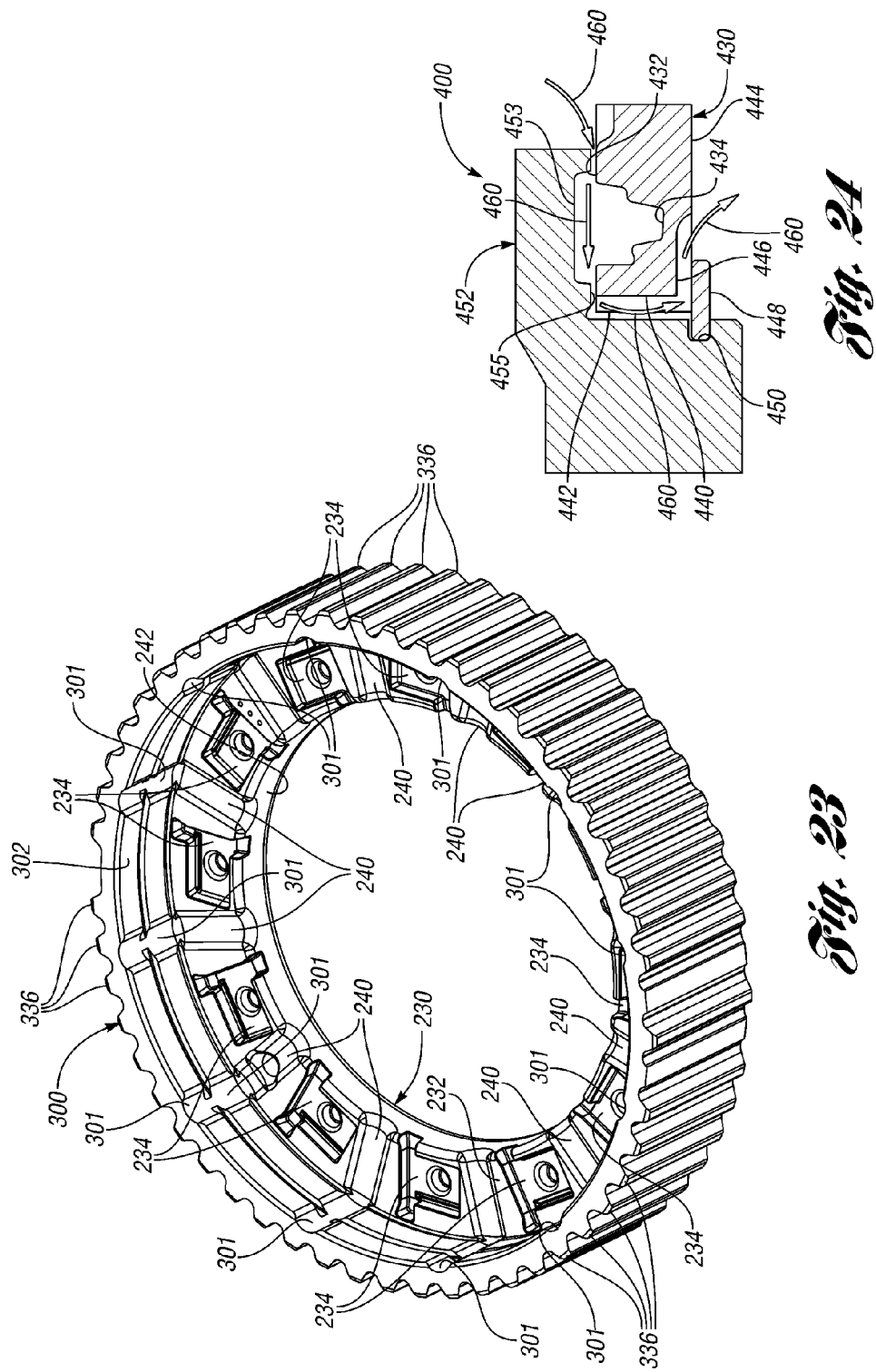

ENGAGEABLE COUPLING ASSEMBLY HAVING REDUCED SPIN LOSSES AND METHOD OF ASSEMBLING SUCH ASSEMBLY WITHIN AN AUTOMOTIVE TRANSMISSION TO REDUCE SUCH LOSSES

CROSS-REFERENCE TO RELATED APPLICATION

This application claims the benefit of U.S. provisional patent application entitled "Overrunning Coupling Assembly And Subassemblies Having Reduced Spin Loss" filed on Feb. 9, 2010 and having U.S. Ser. No. 61/302,617.

BACKGROUND OF THE INVENTION

1. Field of the Invention

This invention relates to engageable coupling assemblies having reduced spin losses and methods of assembling such assemblies within automotive transmissions to reduce such losses.

2. Background Art

One-way clutches are commonly employed in automatic transmissions for automobiles. A one-way clutch allows a first clutch plate to free-wheel in a first rotational direction relative to a second clutch plate, and to clutch in a second rotational direction. Examples include roller clutches and sprag clutches.

As transmission efficiency has become increasingly more important over the last several years, many transmission manufacturers have started to make specifications regarding the amount of torque it takes to spin a one-way clutch during overrun conditions (i.e. spin loss).

U.S. Pat. No. 5,597,057 discloses a one-way clutch apparatus comprising a driving member having a plurality of recesses, a corresponding plurality of biasing members disposed in the recess, a corresponding number of keys or struts disposed over the biasing members in the recesses, and a driven member having a plurality of key-engaging notches formed circumferentially about an inside surface. Each of the keys includes a pair of laterally protruding arm portions and each of the arm portions has a ramp formed thereon which acts as a relief to allow the inside surface of the driven member to be placed to close proximate relationship with the inside surface of a driving member and to overlay portions of the recess. The overlaying enables the driven member to damp or otherwise limit the movement of a back end portion of each key when the driving member is moved in either a free-wheeling direction or driving direction, while the ramp portions allow a front end portion of the key to be urged outwardly without any portion of the arm portion interfering with the inside surface of the driven member overlaying portions of each recess. The one-way clutch apparatus is not as dependent upon a copious and continuous supply of lubricant to damp unwanted movement of the key.

U.S. Pat. No. 5,964,331 discloses an overrunning clutch assembly including first and second ring-shaped clutch members with face surfaces disposed in opposing relation and with at least one rigid strut disposed therebetween for movement to engage recessed pockets in the opposed surfaces upon rotation in one direction and for movement out of engagement with the pockets in at least one of the face surfaces upon relative rotation in the opposite direction. A retaining member permanently retains the clutch in assembled relation and cooperates with the ring-shaped clutch members to form a lubricant reservoir maintaining the struts in a lubricant bath during operation. The retaining member forms a weir over which the lubricant flows from the reservoir at a radial location to assure that the struts remain submerged during operation.

U.S. Pat. No. 6,186,299 discloses an overrunning coupling assembly includes a notch plate and an annular coupling pocket plate positioned in face-to-face relationship with respect to each other along a common axis. The pocket plate has strut pockets disposed at angularly spaced positions about the common axis. The notch plate has notch recesses at angularly spaced positions about the common axis and positioned in juxtaposed relationship with respect to the strut pockets. Torque-transmitting struts are positioned in each of the strut pockets. Each strut has first and second ears at one edge thereof for enabling pivotal motion of the struts about an ear axis intersecting the ears. The opposite edge of each strut is movable between disengaged and engaged positions with respect to one of the notch recesses whereby one-way torque transfer may occur between the plates. A lubricant flows between the notch plate and pocket plate. A spring is positioned in each strut pocket and biases the respective strut toward the notch plate. Each spring engages the respective strut intermediate the ear axis and the opposite edge. Each strut pocket provides sufficient clearance forward of the respective opposite edges of the strut to allow forward sliding movement of the respect strut during overrunning to cause the engagement of the respective spring and strut to occur nearer the ear axis, thereby reducing the length of a moment arm about which the spring acts upon the strut which enables frictional forces of the flowing lubricant to hold the strut in its disengaged position to prevent the strut from slapping against the notch recesses as the notch plate and pocket plate are respectively counterrotated.

U.S. Pat. No. 7,455,157 discloses an overrunning clutch including a cam plate formed with cams angularly spaced about a central axis, and a rocker plate that includes pockets angularly spaced about the central axis. Each pocket includes a first concave surface having a center located within the pocket and through which a pivot axis passes. Each pocket contains a rocker that includes a first convex surface complementary to, and at least partially surrounded by the first concave surface. Springs, supported on the rocker plate, each urge a rocker to pivot about the pivot axis toward the cam plate. In one embodiment, hydraulic lubricant present on a cam surface becomes located between the cam surface and a radial outer surface of the rocker, thereby dampening or cushioning contact between the rocker and the cam. As the rocker ratchets on the cams, lubricant located on a cam surface and an undercut surface is compressed by the ratcheting motion of the rocker and is pumped axially away from a radial flange of the cam plate and the cam surfaces to a journal surface. This pumping action, which occurs when each of thirty-seven cams ratchet over seven rockers per revolution of the cam plate relative to the rocker plate, provides continuous lubricant flow to the journal surface of the cam plate and the mating journal surface of the rocker plate.

U.S. Pat. No. 7,766,144 discloses a clutch plate assembly having a friction interface and internal fluid passages for delivering pressurized fluid to the friction interface to cool the interface, and to reduce spin losses through the clutch assembly. The fluid passages comprise a plurality of primary passages extending inward from a clutch plate inner or outer diameter, and a plurality of secondary fluid passages intersecting the primary fluid passages for conducting fluid to the friction interface. Fluid is directed to the friction interface during clutch engagement for cooling thereof when the clutch assembly is engaging, and separates the clutch plates to reduce spin losses when the clutch assembly is disengaged. A method is also provided for controlling fluid flow at the friction interface, including providing fluid directly to the interface for cooling when the clutch plate assembly is engaging, and for reducing spin losses when the clutch plate assembly is substantially disengaged.

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling", "clutch" and "brake" may be used interchangeably.

Other patent references related to the present invention include U.S. patents and published applications: U.S. Pat. Nos. 5,918,715; 6,193,038, 6,283,265; 6,830,531; 2009/0045024; and 2009/0118933.

Despite the above prior art, there is a need to reduce the torque required (or spin loss) to spin a one-way clutch during overrun conditions.

SUMMARY OF THE INVENTION

An object of at least one embodiment of the present invention is to provide an improved engageable coupling assembly having reduced spin losses and an improved method of assembling such an assembly within an automotive transmission to reduce such losses.

In carrying out the above object and other objects of at least one embodiment of the present invention, an engageable coupling assembly adapted for use with pressurized fluid is provided. The assembly includes first and second coupling members that are supported with respect to each other for relative rotation about a common rotational axis. The coupling members have a first pair of annular faces that oppose each other and define an annular space therebetween. A first face of the first pair has a set of pockets spaced about the rotational axis. A second face of the first pair has a set of locking formations. The coupling members have a second pair of annular faces that oppose each other. A first face of the second pair defines a first set of fluid grooves fluidly communicating the annular space with an exterior surface of the assembly. The fluid grooves are configured to conduct the pressurized fluid from the annular space and out of the assembly in an axial direction during an overrun condition of the assembly, thereby reducing spin losses when the assembly is disengaged.

The fluid grooves may be substantially parallel to each other.

One of the coupling members may include an inner member having an outer diameter and the inner member may define the fluid grooves around the outer diameter.

One of the coupling members may include an inner member and an outer member having a counterbore diameter and the outer member may define the fluid grooves along a length of the diameter.

A rotating one of the coupling member may have the exterior surface. The exterior surface may define a plurality of pumping grooves in fluid communication with the fluid grooves. The pumping grooves may be configured to pump the pressurized fluid from the annular space and through the fluid grooves during the overrun condition.

The other one of the coupling members may have an annular groove. The assembly may further include an annular retaining member that is received by the annular groove to retain the coupling members together. The pumping grooves may pump the pressurized fluid out of the assembly over the retaining member during the overrun condition.

The pumping grooves may have J-shapes.

The first pair of annular faces may be oriented to face axially along the rotational axis.

The pockets may include spring pockets.

The pockets may have T-shapes.

The coupling members may be clutch members.

Space between adjacent pairs of pockets within the annular space may be fluidly communicated with the exterior surface by one of the fluid grooves.

The first face of the first pair may define a second set of fluid grooves which may fluidly communicate the annular space with the first set of fluid grooves.

Further in carrying out the above object and other objects of at least one embodiment of the present invention, an engageable coupling assembly adapted for use with pressurized fluid is provided. The assembly includes first and second coupling members that are supported with respect to each other for relative rotation about a common rotational axis. One of the coupling members has an annular groove. The coupling members have a first pair of annular faces that oppose each other and define an annular space therebetween. A first face of the first pair has a set of pockets spaced about the rotational axis. A second face of the first pair has a set of locking formations. The coupling members have a second pair of annular faces that oppose each other and define a set of fluid passages fluidly communicating the annular space with an exterior surface of the assembly. The assembly further includes an annular retaining member that is received by the annular groove to retain the coupling members together. A rotating one of the coupling members has the exterior surface. The exterior surface defines a plurality of pumping grooves in fluid communication with the set of fluid passages. The pumping grooves are configured to pump the pressurized fluid from the annular space, through the fluid passages and over the retaining member during an overrun condition, thereby reducing spin losses when the assembly is disengaged.

The pumping grooves may have J-shapes.

The fluid passages may be substantially parallel to each other.

The coupling members may be clutch members.

Still further in carrying out the above object and other objects of at least one embodiment of the present invention, a method of assembling a clutch assembly into an automotive transmission to reduce spin losses is provided. The method includes providing an engageable clutch assembly adapted for use with pressurized fluid. The assembly includes first and second clutch members that are supported with respect to each other for relative rotation about a common rotational axis. One of the clutch members has an annular groove. The clutch members have a first pair of annular faces that oppose each other and define an annular space therebetween. A first face of the first pair has a set of pockets spaced about the rotational axis. A second face of the first pair has a set of locking formations. The clutch members have a second pair of annular faces that oppose each other and define a set of fluid passages fluidly communicating the annular space with an exterior surface of the assembly. The assembly further includes an annular retaining member that is received by the annular groove to retain the clutch members together. A rotating one of the clutch members has the exterior surface. The exterior surface defines a plurality of pumping grooves in fluid communication with the set of fluid passages. The pumping grooves are configured to pump the pressurized fluid from the annular space, through the fluid passages and over the retaining member during an overrun condition. The retaining member has circumferentially spaced opposite ends which define a gap. The method further includes assembling the clutch assembly into the transmission so that the gap is at the bottom of the assembly. Fluid within the assembly is allowed to drain from the annular space, through the fluid passages and the pumping grooves and through the gap when the rotating one of the clutch members is not rotating to reduce spin losses when overrunning occurs.

The above object and other objects, features, and advantages of the present invention are readily apparent from the following detailed description of the best mode for carrying out the invention when taken in connection with the accompanying drawings.

BRIEF DESCRIPTION OF THE DRAWING FIGURES AND DETAILED DESCRIPTION OF THE PREFERRED EMBODIMENTS

FIG. 1 is a top plan schematic view of an inner rotating pocket member or race, generally indicated at 30, of an overrunning coupling assembly or one-way clutch. The member 30 has an inner surface 32 in which are formed a plurality of equally spaced pockets 34 (12 illustrated) in which spring-biased struts (not shown) are disposed. The member 30 has a plurality of evenly spaced teeth 36 (48 actual, 60 theoretical) formed in an inner axially extending surface 38 of the member 30. The member 30 also has a plurality of evenly spaced axial grooves 40 (12 illustrated) formed in an outer axially extending surface 42 (i.e., FIG. 2) of the member 30. The grooves 40 comprise oil or lubricant scallops which partially define lubricant paths and fluidly communicate the inner surface 32 of the member 30 with an outer surface 44 of the member 30. The enlarged lubricant paths facilitate the efficient removal of lubricant from the inner surface 32 and, consequently, from the inner bearing surfaces of the clutch of which the member 30 is a part.

A single groove 40 is located between adjacently spaced-apart pockets 34. However, it is to be understood that more than one groove 40 may be located between adjacently spaced-apart pockets 34. The substantially identical axial grooves 40 are spaced around the O.D. (i.e. outer diameter) of the inner member 30. The size of the grooves 40 is dictated by the size of the part and the average amount of oil delivered to the clutch. The grooves 40 run the entire length of the O.D. of the inner race or member 30. The function is to provide a path for the oil to travel through the clutch.

FIG. 2 is a sectional view of the inner member or race 30 taken along lines 2-2 of FIG. 1 wherein the pockets 34 for struts and their associated springs are illustrated.

FIG. 3 is an enlarged, partially broken away view, within the phantom circle designated at 3 in FIG. 1, of a portion of the member 30 and further illustrating one of the grooves 40.

FIG. 4 is an enlarged, partially broken away view, within the phantom oblong designated at 4 in FIG. 1, of a different portion of the member 30 and specifically illustrating one of the pockets 34, one of the grooves 40 and a few of the teeth 36.

FIG. 5 is a view, partially broken away and in cross-section, of the member 30 and specifically illustrating the axial groove 40 and a portion of a J-groove or pumping vein or groove 46 which fluidly communicates the outer surface 44 of the member 30 with the axial groove 40 to further define the lubricant path.

FIG. 6 is a bottom schematic view of the member 30 which specifically illustrates the evenly spaced J-grooves 46 formed in the exterior or back surface 44 of the pocket member 30 and fluidly communicating with their respective axial grooves 40.

The "J-groove" or pumping veins 46 in the back side 44 of the rotating member 30 are shaped and orientated in such a way that when rotated in an overrun condition of the clutch assembly they pull the oil away from the "bearing diameters" of the clutch through the grooves 40 and out of the clutch over an annular retaining member, such as a weir plate or a snap ring 48 (as illustrated in FIGS. 9, 10 and 11).

FIG. 7 is a sectional view taken along lines 7-7 in FIG. 6 and illustrating a portion of one of the J-grooves 46 formed in the back surface 44 of the member 30.

FIG. 8 is a front perspective schematic view of the pocket member 30.

FIG. 9 is a back view of a clutch assembly, generally indicated at 50, including a notch member or plate, generally indicated at 52 in FIGS. 10 and 11, which is secured to the pocket member 30 by the weir plate or snap ring 48. When the retaining member has circumferentially spaced opposite ends which define a gap, preferably, the retaining member such as the snap ring 48 is orientated with respect to the rest of the assembly 50 to allow the clutch assembly 50 to drain through the gap when it is not rotating. In FIG. 9, if a snap ring gap 54 of the ring 48 is at the bottom of the clutch assembly 50 when assembled into the transmission, the oil will drain from the clutch assembly 50. When overrunning begins, as indicated by curved arrow 56, there is less oil in the clutch assembly 54 and therefore less spin loss results.

The notch plate 52 includes notches or locking formations formed in an inner surface thereof and a plurality of radially extending, spaced spline teeth 58 to secure the assembly 50 to the rest of the transmission (not shown) while allowing the pocket member 30 to rotate relative to the notch plate 52. The plates 30 and 52 have a first pair of annular faces that oppose each other and in which the pockets 34 and the locking formations, respectively, are formed.

The annular faces define an annular space therebetween. The plates 30 and 52 also have a second pair of annular faces that oppose each other. A face of the plate 30 includes the fluid grooves 40.

FIG. 10 is a sectional view taken along lines 10-10 of FIG. 9 and further illustrating the clutch assembly 50.

FIG. 11 is a back perspective schematic view of the clutch assembly 50.

Figure 19:
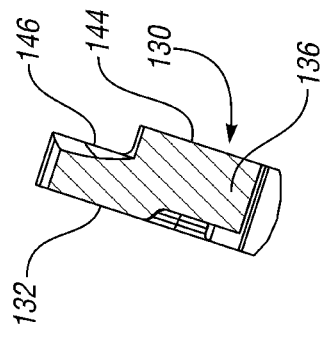

FIG. 12 is a front or top schematic view of the clutch assembly 50 wherein the arrow 56 indicates the overrun direction of the assembly 50 with the outer member or notch plate 52 held stationary.

FIG. 13 is a view, partially broken away and in cross-section, illustrating the spline tooth 58 of the outer member or plate 52 as well as a portion of the snap ring 48 which is held within an annular groove 62 formed in an inner axial surface 64 of the outer member 52. FIG. 13 also illustrates one of the J-grooves 46 which helps to fluidly communicates the front and back surfaces 32 and 44, respectively, of the pocket plate 30 to provide an enlarged path for lubricant (i.e. oil) to reduce spin loss.

FIG. 14 is a top plan schematic view of a second embodiment of an inner rotating pocket plate or member, generally indicated at 130, of an overrunning coupling assembly or one-way clutch (i.e. mechanical diode type). The member 130 has an inner surface 132 in which are formed a plurality of equally spaced pockets 134 (10 illustrated) in which spring-biased struts (not shown) are disposed. The member 130 has a plurality of evenly spaced teeth 136 (30 actual, 40 theoretical) formed on an inner, axially extending surface 138 of the member 130.

The member 130 also has a plurality of evenly spaced, axial grooves 140 (10 illustrated) formed in an outer axially extending surface 142 (i.e., FIG. 15) of the member 130. As in the first embodiment, the grooves 140 comprise oil or lubricant scallops which partially define a lubricant path and fluidly communicate the inner surface 132 of the member 130 with an outer surface 144 of the member 130. The enlarged lubricant paths (greater cross-sectional area through which the oil flows) facilitate the efficient removal of lubricant from the inner surface 132 and, consequently, from the inner bearing surfaces of the clutch of which the member 130 is a part.

A single groove 140 is located between adjacent and spaced-apart pockets 134. As in the first embodiment, more than one groove 140 may be located between adjacently spaced-apart pockets 134. The axial grooves 140 are evenly spaced around the outer diameter of the member 130. The size of the grooves 140 is dictated by the size of the member 130 and the average amount of oil delivered to the clutch. The grooves 140 run the entire length of the outer diameter of the inner race or member 130. Again, the function of the grooves 140 is to provide a path for the oil to travel through the clutch.

FIG. 15 is a sectional view of the inner member or race 130 taken along the lines 15-15 of FIG. 14 wherein the pockets 134 for the struts and their associated springs are illustrated.

FIG. 16 is an end, partially broken away, view of the member 130 taken along the direction of the arrow 16 in FIG. 14 and illustrating the groove 140.

Figure 17:
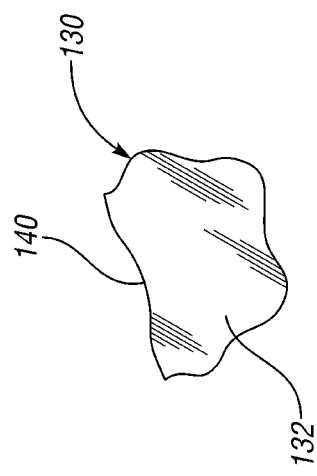

FIG. 17 is an enlarged view, partially broken away and within the phantom circle 17 in FIG. 14, of the groove 140.

Figure 18:
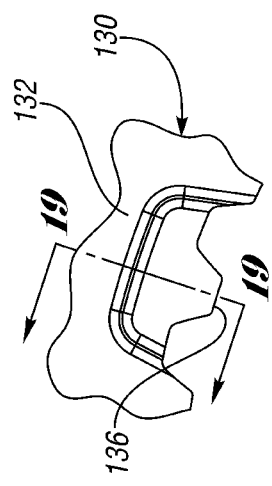

FIG. 18 is an enlarged view, partially broken away and within the phantom circle 18 in FIG. 14, of one of the teeth 136 of the member 130.

FIG. 19 is a view, partially broken away and in cross-section, taken along lines 19-19 of FIG. 18 of one of the teeth 136 and further illustrating one of the J-grooves 146.

FIG. 20 is a bottom schematic view of the member 130 which specifically illustrates the spaced, curved J-grooves 146 formed in the exterior or back surface 144 of the member 130 and fluidly communicating with their respective axial grooves 140. As in the first embodiment, the "J-groove" or pumping veins 146 is the back side surface 144 of the rotating member 130 are shaped and oriented in such a way that, when rotated in an overrun condition of the entire clutch assembly, they pull the oil away from the "bearing diameters" of the clutch through the grooves 140 and out over an annular retaining member such as a weir plate or snap ring (not shown).

FIG. 21 is a sectional view taken along lines 21-21 in FIG. 20 and illustrating one of the J-grooves 146 formed in the back surface 144 of the member 130.

FIG. 22 is a top perspective, schematic view of the pocket member 130.

FIG. 23 is a perspective, schematic view of another embodiment of an inner pocket plate, generally indicated at 230, coupled to an outer axially extending externally toothed member, generally indicated at 300, to rotate therewith. The plate 230 and the member 300 form a coupling or clutch member. A corresponding notch plate or member is not shown for simplicity. Oil passages or scallops 240 are formed in an inner surface 232 of the plate 230 between pockets 234 of the member 230. The passages 240 extend between and fluidly communicate an inner axial surface 242 of the member 230 and axial grooves or oil passages 301 formed in inner surface (i.e. counterbore diameter) 302 of the outer member 300. The outer surface of the outer member 300 includes axial extending teeth 336 to rotate the member 300 and the plate 230 together. Again, the passages 240 and the passages 301 help convey lubricant efficiently through the clutch to reduce spin loss.

FIG. 24 is an enlarged sectional view of an overrunning coupling assembly or one-way clutch, generally indicated as 400, constructed in accordance with yet another embodiment of the present invention. The assembly 400 includes a pocket member or plate, generally indicated at 430, including an inner surface 432 in which are formed a plurality of equally spaced pockets 434 (only one shown) in which a plurality of spring-biased struts (not shown) are disposed.

The pocket plate 430 includes a plurality of evenly spaced axial grooves 440 (only one shown) formed in an outer axially extending surface 442 of the member 430. The plate 430 also includes a plurality of evenly spaced J-grooves or pumping veins 446 which fluidly communicate an outer surface 444 of the member 430 with the axial groove 440 much like the grooves 46 fluidly communicate the outer surface 44 with the axial grooves 40 in the first embodiment.

The assembly 400 also includes a notch plate, generally indicated at 452, which is secured to the pocket member or plate 430 by an annular retaining member such as a weir plate or snap ring 448. The ring 448 is located in a slot 450 formed in the notch plate 452. The notch plate 452 includes a plurality of locking formations 453 formed in an inner surface 455 of the notch plate 452.

Arrows 460 illustrate an enlarged lubricant path or flow having an enlarged cross section between the inner surfaces of the notch plate 452, the pocket plate 430 and the snap ring 448 (as in the first embodiment) to facilitate the efficient removal of lubricant from the interior of the assembly 400 thereby reducing spin loss.

In general, perfectly flat parts are not desired. Through a secondary operation, such as sintering or coining, a small amount of waviness (approximately 0.004" to 0.008") can be created around the part. This keeps the datum planes of the mating parts from being flat. When two flat planes come together, the oil between them is pushed out. This can result in stiction between the parts thereby increasing spin loss. Waviness in the parts keeps an oil path between them. The oil flow through this path combined with the relative motion between the parts creates a film of oil between them so that stiction cannot occur.

Axial and radial clearance play a major role in spin loss. Basically, the more clearance one has, the better the spin loss characteristics. Any MD (i.e. mechanical diode) one-way clutch has to have clearance to function. Often the clearances are dictated by the needs of the transmission.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An engageable coupling assembly adapted for use with pressurized fluid, the assembly comprising:

first and second coupling members that are supported with respect to each other for relative rotation about a common rotational axis, the coupling members having a first pair of annular faces that oppose each other and define an annular space therebetween, a first face of the first pair having a set of pockets spaced about the rotational axis, a second face of the first pair having a set of locking formations, the coupling members having a second pair of annular faces that oppose each other, a first face of the second pair defining a first set of fluid grooves fluidly communicating the annular space with an exterior surface of the assembly and wherein the fluid grooves are configured to conduct the pressurized fluid from the annular space and out of the assembly in an axial direction during an overrun condition of the assembly, thereby reducing spin losses when the assembly is disengaged wherein a rotating one of the coupling members has the exterior surface, the exterior surface defining a plurality of pumping grooves in fluid communication with the fluid grooves and wherein the pumping grooves are configured to pump the pressurized fluid from the annular space and through the fluid grooves during the overrun condition.

2. The assembly as claimed in claim 1, wherein the fluid grooves are substantially parallel to each other.

3. The assembly as claimed in claim 1, wherein one of the coupling members includes an inner member having an outer diameter and wherein the inner member defines the fluid grooves around the outer diameter.

4. The assembly as claimed in claim 1, wherein one of the coupling members includes an inner member and an outer member having a counterbore diameter and wherein the outer member defines the fluid grooves along a length of the diameter.

5. The assembly as claimed in claim 1, wherein the other one of the coupling members has an annular groove and wherein the assembly further includes an annular retaining member that is received by the annular groove to retain the coupling members together and wherein the pumping grooves pump the pressurized fluid out of the assembly over the retaining member during the overrun condition.

6. The assembly as claimed in claim 1, wherein the pumping grooves have J-shapes.

7. The assembly as claimed in claim 1, wherein the first pair of annular faces are oriented to face axially along the rotational axis.

8. The assembly as claimed in claim 1, wherein the pockets include spring pockets.

9. The assembly as claimed in claim 1, wherein the pockets have T-shapes.

10. The assembly as claimed in claim 1, wherein coupling members are clutch members.

11. The assembly as claimed in claim 1, wherein space between adjacent pairs of pockets within the annular space is fluidly communicated with the exterior surface by one of the fluid grooves.

12. The assembly as claimed in claim 1, wherein the first face of the first pair defines a second set of fluid grooves which fluidly communicate the annular space with the first set of fluid grooves.

13. An engageable coupling assembly adapted for use with pressurized fluid, the assembly comprising:
first and second coupling members that are supported with respect to each other for relative rotation about a common rotational axis, wherein one of the coupling members has an annular groove, the coupling members having a first pair of annular faces that oppose each other and define an annular space therebetween, a first face of the first pair having a set of pockets spaced about the rotational axis, a second face of the first pair having a set of locking formations, the coupling members having a second pair of annular faces that oppose each other and define a set of fluid passages fluidly communicating the annular space with an exterior surface of the assembly; and
an annular retaining member that is received by the annular groove to retain the coupling members together wherein a rotating one of the coupling members has the exterior surface, the exterior surface defining a plurality of pumping grooves in fluid communication with the set of fluid passages and wherein the pumping grooves are configured to pump the pressurized fluid from the annular space, through the fluid passages and over the retaining member during an overrun condition, thereby reducing spin losses when the assembly is disengaged.

14. The assembly as claimed in claim 13, wherein the pumping grooves have J-shapes.

15. The assembly as claimed in claim 13, wherein the fluid passages are substantially parallel to each other.

16. The assembly as claimed in claim 13, wherein the coupling members are clutch members.

17. A method of assembling a clutch assembly into an automotive transmission to reduce spin losses, the method comprising:
providing an engageable clutch assembly adapted for use with pressurized fluid, the assembly including first and second clutch members that are supported with respect to each other for relative rotation about a common rotational axis, wherein one of the clutch members has an annular groove, the clutch members having a first pair of annular faces that oppose each other and define an annular space therebetween, a first face of the first pair having a set of pockets spaced about the rotational axis, a second face of the first pair having a set of locking formations, the clutch members having a second pair of annular faces that oppose each other and define a set of fluid passages fluidly communicating the annular space with an exterior surface of the assembly; the assembly further including an annular retaining member that is received by the annular groove to retain the clutch members together wherein a rotating one of the clutch members has the exterior surface, the exterior surface defining a plurality of pumping grooves in fluid communication with the set of fluid passages and wherein the pumping grooves are configured to pump the pressurized fluid from the annular space, through the fluid passages and over the retaining member during an overrun condition, the retaining member having circumferentially spaced opposite ends which define a gap; and
assembling the clutch assembly into the transmission so that the gap is at the bottom of the assembly wherein fluid within the assembly is allowed to drain from the annular space, through the fluid passages and the pumping grooves and through the gap when the rotating one of the clutch members is not rotating to reduce spin losses when overrunning occurs.

\* \* \* \* \*